(12) United States Patent
Greyzck

(10) Patent No.: US 8,583,898 B2
(45) Date of Patent: Nov. 12, 2013

(54) SYSTEM AND METHOD FOR MANAGING PROCESSOR-IN-MEMORY (PIM) OPERATIONS

(75) Inventor: Terry D. Greyzck, Eagan, MN (US)

(73) Assignee: Cray Inc., Seattle, WA (US)

( * ) Notice: Subject to any disclaimer, the term of this patent is extended or adjusted under 35 U.S.C. 154(b) by 947 days.

(21) Appl. No.: 12/484,062

(22) Filed: Jun. 12, 2009

(65) Prior Publication Data

US 2010/0318764 A1    Dec. 16, 2010

(51) Int. Cl.
*G06F 7/38* (2006.01)
*G06K 9/00* (2006.01)

(52) U.S. Cl.
USPC .......................... 712/208; 382/253; 717/143

(58) Field of Classification Search
USPC .......................................................... 717/143
See application file for complete search history.

(56) References Cited

U.S. PATENT DOCUMENTS

| | | | |
|---|---|---|---|
| 4,047,158 A * | 9/1977 | Jennings | 710/46 |
| 4,128,880 A | 12/1978 | Cray, Jr. | |
| 4,710,872 A | 12/1987 | Scarborough | |
| 4,817,187 A * | 3/1989 | Lien | 382/253 |
| 4,821,181 A | 4/1989 | Iwasawa et al. | |
| 4,833,606 A | 5/1989 | Iwasawa et al. | |
| 4,858,115 A | 8/1989 | Rusterholz et al. | |
| 4,967,350 A | 10/1990 | Maeda et al. | |
| 5,036,454 A | 7/1991 | Rau et al. | |
| 5,083,267 A | 1/1992 | Rau et al. | |
| 5,151,991 A | 9/1992 | Iwasawa et al. | |
| 5,247,696 A * | 9/1993 | Booth | 717/150 |
| 5,408,677 A | 4/1995 | Nogi | |
| 5,623,685 A * | 4/1997 | Leedom et al. | 712/9 |
| 6,560,282 B2 * | 5/2003 | Tahara et al. | 375/240.02 |
| 6,578,197 B1 * | 6/2003 | Peercy et al. | 717/143 |
| 7,360,142 B1 | 4/2008 | Barash | |
| 7,656,706 B2 * | 2/2010 | Jiang et al. | 365/185.03 |
| 7,660,967 B2 | 2/2010 | Hutson | |
| 2004/0006667 A1 | 1/2004 | Bik et al. | |
| 2005/0240644 A1 * | 10/2005 | Van Berkel et al. | 708/441 |
| 2006/0167784 A1 * | 7/2006 | Hoffberg | 705/37 |
| 2006/0248286 A1 * | 11/2006 | Scott et al. | 711/141 |
| 2009/0138680 A1 * | 5/2009 | Johnson et al. | 712/208 |
| 2010/0318769 A1 | 12/2010 | Greyzck | |
| 2010/0318979 A1 | 12/2010 | Greyzck | |

FOREIGN PATENT DOCUMENTS

JP    63-120338 A    5/1988

OTHER PUBLICATIONS

Fang et al., "Active Memory Operations", The 21st International Conference on Supercomputing, Jun. 18-20, 2007, 10 pages.
Kumar et al., "Atomic Vector Operations on Chip Multiprocessors", Proceedings of the 35th Annual International Symposium on Computer Architecture, Jun. 21-25, 2008, IEEE Computer Society Washington, DC, USA 2008, pp. 441-452.

* cited by examiner

*Primary Examiner* — Don Wong
*Assistant Examiner* — Mohammad Kabir
(74) *Attorney, Agent, or Firm* — Perkins Coie LLP

(57) ABSTRACT

A system and method of compiling program code, wherein the program code includes an operation on an array of data elements stored in memory of a computer system. The program code is scanned for operations that are vectorizable. The vectorizable operations are examined to determine whether they should be executed at least in part in a vector atomic memory operation (AMO) functional unit attached to memory. If so, the compiled code includes vector AMO instructions.

18 Claims, 3 Drawing Sheets

SYSTEM AND METHOD FOR MANAGING PROCESSOR-IN-MEMORY (PIM) OPERATIONS

FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. MDA904-02-3-0052, awarded by the Maryland Procurement Office.

RELATED APPLICATION

This application is related to U.S. patent application Ser. No. 11/946,490, filed Nov. 28, 2007, entitled "Vector Atomic Memory Operations," which is incorporated herein by reference.

FIELD OF THE INVENTION

The invention relates generally to vector computer software, and more specifically to a system and method for managing processor-in-memory (PIM) operations.

BACKGROUND

Supercomputers are high performance computing platforms that employ a pipelined vector processing approach to solving numerical problems. Vectors are ordered sets of data. Problems that can be structured as a sequence of operations on vectors can experience one to two orders of magnitude increased throughput when executed on a vector machine (compared to execution on a scalar machine of the same cost). Pipelining further increases throughput by hiding memory latency through the prefetching of instructions and data.

A pipelined vector machine is disclosed in U.S. Pat. No. 4,128,880, issued Dec. 5, 1978, to Cray, the disclosure of which is hereby incorporated herein by reference. In the Cray machine, vectors are usually processed by loading them into operand vector registers, streaming them through a data processing pipeline having a functional unit, and receiving the output in a result vector register.

For vectorizable problems, vector processing is faster and more efficient than scalar processing. Overhead associated with maintenance of the loop-control variable (for example, incrementing and checking the count) is reduced. In addition, central memory conflicts are reduced (fewer but bigger requests) and data processing units are used more efficiently (through data streaming).

Vector processing supercomputers are used for a variety of large-scale numerical problems. Applications typically are highly structured computations that model physical processes. They exhibit a heavy dependence on floating-point arithmetic due to the potentially large dynamic range of values within these computations. Problems requiring modeling of heat or fluid flow, or of the behavior of a plasma, are examples of such applications.

Program code for execution on vector processing supercomputers must be vectorized to exploit the performance advantages of vector processing. Vectorization typically transforms an iterative loop into a nested loop with an inner loop of VL iterations, where VL is the length of the vector registers of the system. This process is known as "strip mining" the loop. In strip mining, the number of iterations in the internal loop is either fixed, or defined by the length of a vector register, depending on the hardware implementation; the number of iterations of the external loop is defined as an integer number of vector lengths. Any remaining iterations are performed as a separate loop placed before or after the nested loop, or alternately as constrained-length vector operations within the body of the vector loop.

Compilers exist that will automatically apply strip mining techniques to scalar loops within program code to create vectorized loops. This capability greatly simplifies programming efficient vector processing.

The memory to processor round trip time (in clock cycles) has grown rapidly as clock rates increase and the memory to processor interface becomes increasingly pipelined. Systems have been suggested that place processors closer to memory in order to reduce the number of cycles spent transferring data between processors and memory. In some processor-in-memory systems, the processor and the memory are collocated on the same board, or on the same piece of silicon. Such an approach is, however, expensive, requiring special hardware.

It is clear that there is a need for improved methods of balancing PIM operations against conventional processors in multiprocessor systems.

DETAILED DESCRIPTION

The present invention provides a system and method for balancing PIM operations against conventional processors. The system and method balance the cost in time of fetching data from memory and storing data to memory against the efficiency of performing calculations in one or more processors. That is, is it better to avoid memory overhead and perform operations in the slower arithmetic units of a processor-in-memory, or is it better to accept the memory overhead in order to gain the increased speed of processors in a distributed processor system?

Figure 1:
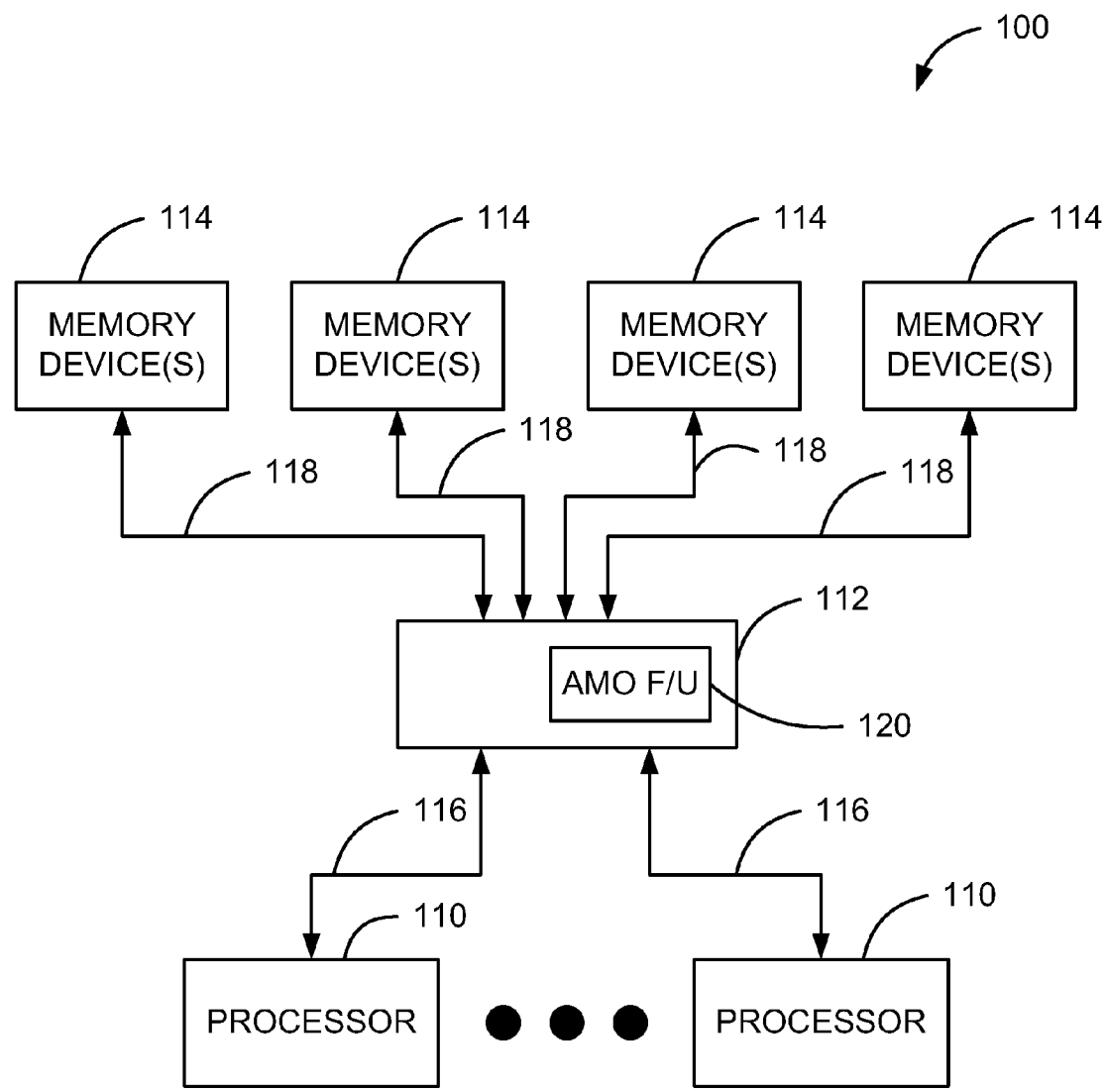
FIG. 1 shows a functional block diagram of a computer system with vector atomic memory capability.

FIG. 1 illustrates a functional block diagram of a computer system 100, including one or more processors 110 connected through a memory controller 112 to one or more memory devices 114.

Processor 110 is not limited to any particular type of processor. In various embodiments, processor 110 is not a single processor, and may include any number of processors operating in a multi-processor system. In various embodiments, processor 110 includes cache memory.

In one embodiment, system 100 is a node in a larger system. In one such embodiment, each node includes four processors 110 and sixteen memory controllers 112. Channels 116 between processors 110 and controllers 112 use a 4-bit wide 5.0 Gbaud serializer/deserializer (SerDes) for an aggregate channel bandwidth of 16×2.5 Gbytes/s=40 Gbytes/s per direction—160 Gbytes/s per direction for each node.

In one such embodiment, controllers 112 serve as pin expanders, converting a small number of high-speed differential signals received from the processors 110 on channels 116 into a large number of single-ended signals that interface to commodity DDR2 memory parts on memory channels 118. Each memory controller 112 manages four DDR2 memory channels, each with a 40-bit-wide data/ECC path. The 32-bit data path, coupled with the four-deep memory access bursts of DDR2, provides a minimum transfer granularity of only 16 bytes. Thus the controller 112 with its associated memory devices have twice the peak data bandwidth and four times the single-word bandwidth of a standard 72-bit-wide DIMM.

In one embodiment, each memory channel 118 is connected to up to ten DDR2 DRAM.

In one embodiment, two or more processors 110 are located on a single compute node printed circuit board. In one such embodiment, the memory controller 112 and its associated memory devices 114 are located on a memory daughter card (MDC) that plugs into a connector on the compute node printed circuit board. Each of the eight MDCs contains 20 or 40 memory parts, providing up to 128 Gbytes of memory capacity per node using 1-Gbit memory parts.

Returning to FIG. 1, memory devices 114 are not limited to any particular type of memory device. In various embodiments, memory devices 114 includes DRAM memory. In various embodiments, one or more memory devices 114 are double-data-rate two synchronous dynamic random access (DDR2 SDRAM) memory devices.

Memory device 114 is not limited to any particular configuration. In various embodiments, memory chips within memory device 114 are organized as five 8-bit devices, for a total of 40 bits. In some embodiments, only 39 of the 40 bits are used, where 32 bits are used for data and 7 bits are used to store an error correction code associated with the data bits. In various embodiments, the remaining bit is used to dynamically map out bad bits within the device, including the spare bit in a spare-bit insertion to repair persistent memory errors within the memory location providing the spare bit and having a persistent bit error.

Some processor operations are considered atomic, in that their occurrence can be considered a single event to the rest of the processor. More specifically, an atomic operation does not halfway complete, but either completes successfully or does not complete. This is important in a processor to ensure the validity of data, such as where multiple threads or operations can be operating on the same data type at the same time. For example, if two separate processes intent to read the same memory location, increment the value, and write the updated value back to memory, both processes may read the memory value before it is written back to memory. When the processes write the data, the second process to write the data will be writing a value that is out of date, as it does not reflect the result of the previously completed read and increment operation.

This problem can be managed using various mechanisms to make such operations atomic, such that the operation locks the data until the operation is complete or otherwise operates as an atomic operation and does not appear to the rest of the processor to comprise separate read and increment steps. This ensures that the data is not modified or used for other instructions while the atomic instruction completes, preserving the validity of the instruction result.

System 100 includes a new type of instruction for a computer processor, in which atomic operations on memory can be vectorized, operating on multiple memory locations at the same time or via the same instruction. This addition to the instruction set makes more efficient use of the memory and network bandwidth in a multiprocessor system, and enables vectorization of more program loops in many program applications. In one embodiment, as is shown in FIG. 1, each memory controller 112 includes an atomic memory operation functional unit 120 capable of performing vector atomic memory operation (AMO) instructions.

Examples of atomic memory operations included in one embodiment of AMO functional unit 120 include a vector atomic add, vector atomic AND, vector atomic OR, vector atomic XOR, vector atomic fetch and add, vector atomic fetch and AND, vector atomic fetch and OR, and a vector atomic fetch and XOR. The non-fetch versions of these instructions read the memory location, perform the specified operation, between the instruction data and the memory location data, and store the result to the memory location. The fetch versions perform similar functions, but also return the result of the operation to the processor rather than simply storing the result to memory.

There are two vector types in various embodiments, including strided and indexed vectors. Strided vectors use a base and a stride to create a vector length of the stride length starting at the base address. Indexed vector access uses a base and a vector of indexes to create a vector of memory addresses, enabling specification of a vector comprising elements that are not in order or evenly spaced.

In one embodiment, hardware implementation of the vector atomic memory operations includes use of additional decode logic to decode the new type of vector atomic memory instruction. Vector registers in the processor and a vector mask are used to generate the vector instruction, and a single atomic memory instruction in the processor issues a number of atomic memory operations. In the memory system, vector atomic memory operations operate much like scalar atomic memory operations, and the memory manager block provides the atomic memory operation support needed to execute these instructions.

In one embodiment, system 100 includes vector Atomic Memory Operation (vector AMO or VAMO) instructions. One such instruction is:

[Aj,Vk]AADD([Aj,Vk],Vi)

This represents an integer addition operation that operates on a series of memory locations defined by adding a base scalar register (Aj) to a vector of offsets (Vk). The memory locations defined by the resulting vector of addresses is incremented by the corresponding amount in vector (Vi), on an element-by-element basis. The memory system guarantees that if multiple elements of the vector of addresses defined by (Aj+Vk) are identical, the multiple instances are not performed simultaneously. This guarantees the same result as if the operation was performed with an equivalent series of scalar operations, as would happen on a non-vector architecture.

In one such embodiment, system 100 also includes a vector atomic AND instruction and a vector atomic OR instruction.

[Aj,Vk]AAND([Aj,Vk],Vi)

This represents an AND operation that operates on a series of memory locations defined by adding a base scalar register (Aj) to a vector of offsets (Vk). The memory locations defined by the resulting vector of addresses are ANDed to a corresponding element in vector (Vi), on an element-by-element basis. The memory system guarantees that if multiple elements of the vector of addresses defined by (Ai+Vk) are identical, the multiple instances are not performed simultaneously. This guarantees the same result as if the operation was performed with an equivalent series of scalar operations, as would happen on a non-vector architecture.

In one such embodiment, system 100 also includes a vector atomic OR instruction.

[Aj,Vk]AOR([Aj,Vk],Vi)

This represents an OR operation that operates on a series of memory locations defined by adding a base scalar register (Aj) to a vector of offsets (Vk). The memory locations defined by the resulting vector of addresses are ORed to a corresponding element in vector (Vi), on an element-by-element basis. The memory system guarantees that if multiple elements of the vector of addresses defined by (Ai+Vk) are identical, the multiple instances are not performed simultaneously. This guarantees the same result as if the operation was performed with an equivalent series of scalar operations, as would happen on a non-vector architecture.

In one embodiment, other operations are provided for integer bitwise operations such as bitwise and, bitwise or, and bitwise exclusive or. The possible instructions are not limited by any particular architecture, and are easily extended to support any commutative operation such as floating point and complex addition or multiplication, integer multiplication, or other bit manipulation primitives. One such vector AMO instruction set is described in U.S. patent application Ser. No. 11/946,490, filed Nov. 28, 2007 entitled "Vector Atomic Memory Operations", the description of which is incorporated herein by reference.

Figure 2:
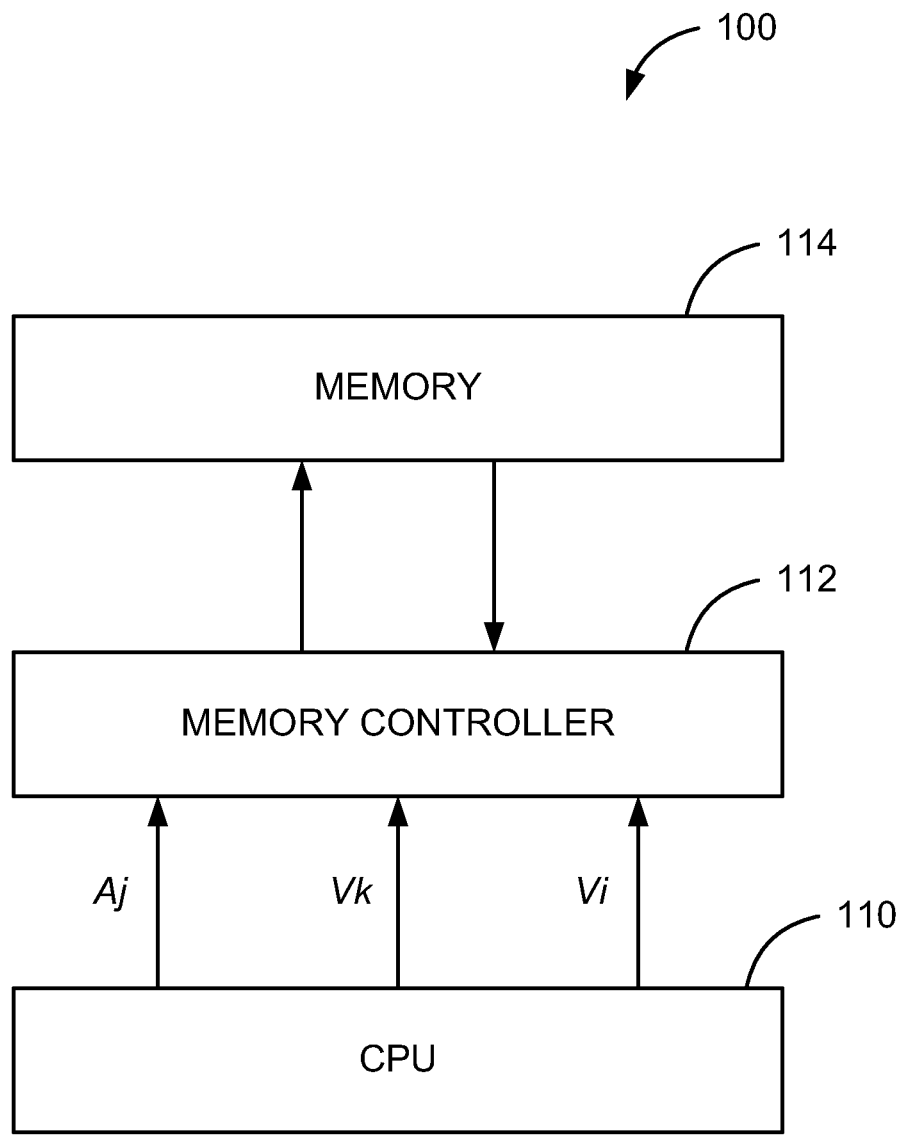
FIG. 2 shows a vector atomic memory operation.

FIG. 2 illustrates a vector atomic memory operation. As can be seen in FIG. 2, Aj is the address of x, the vector Vk is a vector of ix values, while the vector Vi is a vector of y values. [Aj, Vk, W]. The vector atomic memory operation [Aj,Vk] AADD([Aj,Vk],Vi) can then express:

$$x[ix[i]] = x[ix[i]] + y[i];$$

where Aj=address of x, Vk=vector of ix values and Vi=vector of y values.

The vector ix can contain repeated values, and memory controller 112 will detect and process them correctly.

In one embodiment, the Vector AMO may execute out order. In such embodiments, the method should only be used in situations where the operations to the same memory location can occur out of order.

The vector AMO instruction set can be used to implement processor-in-memory operations across computer system 100. In one embodiment, a check is made to determine if the calculation to be performed falls within the class of problems with a potential for more efficient execution in a PIM operation than in a processor 110 in a multiprocessor system such as system 100 of FIG. 1. If the computation falls within the class of problems with a potential for more efficient execution in a PIM operation than in a processor, the code is changed to include the appropriate vector atomic memory operation or operations.

In one embodiment, the decision whether to execute the computation in a processor or in vector AMO functional unit 120 is based on estimates of memory travel time and processor execution time. For instance, in some embodiments, statements such as ia(i)=ia(i)+1 will always be done in vector AMO functional unit 120 since the elements to be added are all present in the vector AMO functional unit 120. This frees up processor and network bandwidth since the references to ia(i) never have to travel to processor 110; the entire operation happens in memory controller 114. On the other hand, combinations of computations that can be chained in vector functional units may more appropriately be performed in processor 110. In some embodiments, when to use vector AMO functional unit 120 versus processor 110, and vice versa, will be based on heuristics, with the balance selected as a function of observation and expectation.

In one embodiment, the method takes advantage of language constructs available in some programming languages. For instance, UPC and Co-array Fortran both include an extra dimension on their arrays that depict processor number. When system 100 parallelizes across that dimension, it uses the vector AMO instructions as much as possible.

An advantage of this method of selecting between processor 110 and the PIM operations of vector AMO functional unit 120 is that it can be adapted to a variety of architectures to balance their use of conventional and PIM operations. In addition, it can be used to parallelize across vectors as well as across processors in multiprocessor systems.

Figure 3:
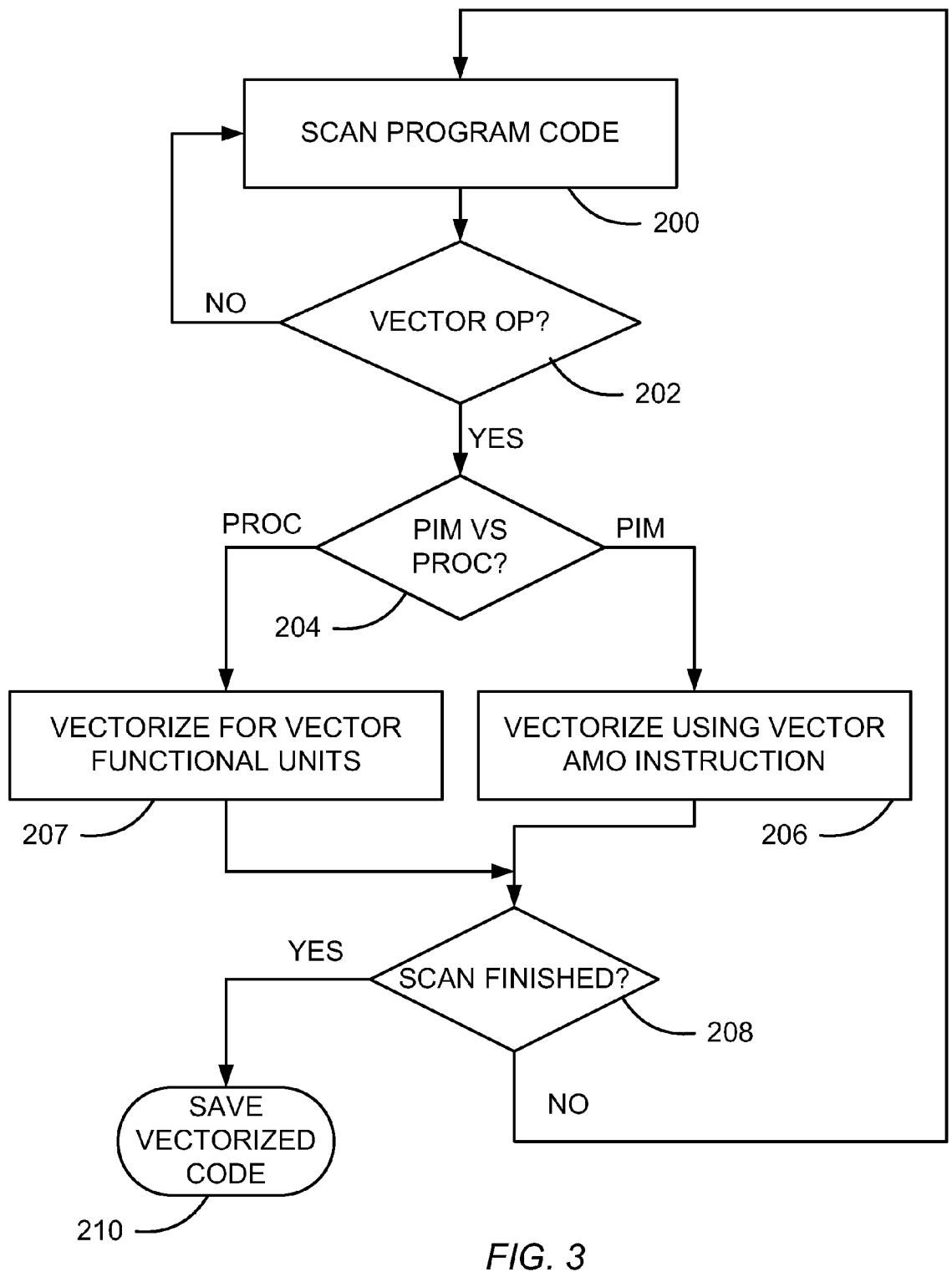
FIG. 3 illustrates vectorization according to the present invention.

A method of compiling program code is shown in FIG. 3. In the method of FIG. 3, the program code includes an operation on an array of data elements stored in memory of a computer system. The program code is scanned at 200 for an equation which could be executed as a vector computation. On detecting at 202 that an equation could be executed as a vector computation, control moves to 204, where the equation is reviewed to determine if it is a candidate for a PIM vector operation. If so, control moves to 206 and the equation is vectorized where possible with vector AMO instructions. Control then moves to 208.

If at 204, it is determined that the equation being reviewed is not a candidate for a PIM vector operation, control moves to 207 and the equation is vectorized where possible to use the vector functional units of processor 110. Control then moves to 208.

In some instances, an equation will most effectively be vectorized with a combination of instructions for the vector functional units in processors 110 and the vector AMO functional units 120. In such instance, the compiler will use a combination of vector AMO instructions and vector functional unit instructions.

At 208, a check is made to see if the scan is finished. If not, control moves to 200. Otherwise, control moves to 210 and the vectorized code is saved.

In one such embodiment, each equation is decomposed into a nested loop, wherein the nested loop comprises an exterior loop and a virtual interior loop. The exterior loop decomposes the equation into a plurality of loops of length N, wherein N is an integer greater than one. The virtual interior loop executes vector operations corresponding to the N length loop to form a result vector of length N, wherein the virtual interior loop includes a vector atomic memory operation (AMO) instruction.

In one embodiment, N is set to equal the vector length of the vector register in the computer system.

In one embodiment, the following operations are available to execute in vector AMO functional units 120.

Bitwise or—|—AOR
Bitwise and—&—AAND
Bitwise exclusive or—ô—AXOR
Integer add—+—AADD In addition, the above operations can be used to provide the following extended operations:

Bitwise equivalence—.EQV. in Fortran (done with AXOR and some preprocessing)
One's complement—~—AXOR with a word of all 1's
Floating point negation—'-'—AXOR with a constant that just has the sign bit set The method of the present invention improves performance of computer system 100 by balancing memory transfer overhead and computational speed when vectorizing. Operations performed in vector AMO functional units 120 avoid the use of vector registers for the computation, moving the functionality onto the hardware memory system. This avoids the time normally taken moving data to and from the central processor.

Furthermore, the method works for multiprocessor parallelism in addition to local vectorization, as the hardware memory system of vector AMO functional unit 120 can be used to parallelize across processors as well as across vectors.

This method can be used with the vector update method described in U.S. patent application Ser. No. 12/483,672, filed herewith, entitled "Vector Atomic Memory Operation Vector Update System and Method", the description of which is incorporated herein by reference, to determine the equations that can be vectorized to use the vector functional units of processors 110 versus the equations that, if vectorized at all, must be vectorized using vector AMO functional units 120.

In one such embodiment, each equation is decomposed into a nested loop, wherein the nested loop comprises an exterior loop and a virtual interior loop. The exterior loop decomposes the equation into a plurality of loops of length N, wherein N is an integer greater than one. The virtual interior loop executes vector operations corresponding to the N length loop to form a result vector of length N, wherein the virtual interior loop includes a vector atomic memory operation (AMO) instruction used to execute the interior loop.

In one embodiment, N is set to equal the vector length of the vector register in the computer system.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the subject matter described herein. It is intended that this subject matter be limited only by the claims, and the full scope of equivalents thereof.

Such embodiments of the subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

The Abstract is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

The invention claimed is:

1. A method performed by a computer system during compilation of program code for vectorizing an iterative loop of the program code for execution by a vector computer system having a plurality of processors connected to memory, wherein the memory includes one or more vector atomic memory operation (AMO) functional units and the processors include one or more vector functional units, the method comprising:
   scanning the program code, wherein scanning includes determining whether an operation of the iterative loop is vectorizable;
   if an operation is vectorizable, determining whether the operation should be executed using a vector AMO instruction in one of the vector AMO functional units;
   if an operation is vectorizable and the operation should be executed using a vector AMO instruction in one of the vector AMO functional units, compiling at least a portion of the operation into a vector AMO instruction; and
   if an operation is vectorizable and the operation should not be executed using a vector AMO instruction in one of the vector AMO functional units, compiling at least a portion of the operation to execute in one or more vector functional units of one or more processors.

2. The method of claim 1, wherein determining whether the operation should be executed using a vector AMO instruction in one of the vector AMO functional units is a function of memory transfer overhead.

3. The method of claim 1, wherein determining whether the operation should be executed using a vector AMO instruction in one of the vector AMO functional units is a function of computational speed difference between one or more of the vector functional units and one or more of the vector AMO functional units.

4. The method of claim 1, wherein the program code includes an array having an additional dimension depicting processor number and wherein determining whether the operation should be executed using a vector AMO instruction in one of the vector AMO functional units is a function of processor number.

5. The method of claim 1, wherein the vector atomic memory operation is performed in a memory controller.

6. A computer implemented method of compiling program code for execution by a vector computer system having a plurality of processors connected to memory, wherein the memory includes one or more vector atomic memory operation (AMO) functional units and the processors include one or more vector functional units, the method comprising:
   a) scanning the program code for an operation that is vectorizable;
   b) determining whether some portion of the vectorizable equation should be executed in the vector AMO functional unit; and
   c) generating compiled code to replace the equation with vectorized machine executable code;
   wherein, if a determination was made that some portion of the vectorizable equation should be executed in the vector AMO functional unit, the vectorized machine executable code includes vectorization code for performing a mathematical operation using one or more vector atomic memory operations; and
   wherein, if a determination was made that some portion of the vectorizable equation should be not executed in the vector AMO functional unit, the vectorized machine executable code includes vectorization code for performing vector operations without using the vector AMO functional unit.

7. The method of claim 6, wherein the vector atomic memory operation is performed in a memory controller.

8. The method of claim 6, determining whether some portion of the vectorizable equation should be executed in the vector AMO functional unit includes determining whether an operation has recurring data points.

9. The method of claim 6, wherein determining whether some portion of the vectorizable equation should be executed in the vector AMO functional unit is a function of memory transfer overhead.

10. The method of claim 6, wherein determining whether some portion of the vectorizable equation should be executed in the vector AMO functional unit is a function of computational speed difference between one or more of the vector functional units and one or more of the vector AMO functional units.

11. The method of claim 6, wherein the program code includes an array having an additional dimension depicting processor number and wherein determining whether some portion of the vectorizable equation should be executed in the vector AMO functional unit is a function of processor number.

12. An article comprising a memory having instructions for controlling a computer to compile program code into code for execution by an vector atomic memory operation (AMO) functional unit and by a vector functional unit of a vector computer system, the instructions comprising instructions that:
  identify a vectorizable equation within the program code;
  identify a first portion of the vectorizable equation that should be executed using a vector AMO instruction in one of the vector AMO functional units;
  output a vector AMO instruction to implement the first portion;
  identify a second portion of the vectorizable equation that should be executed using a vector AMO instruction in one of the vector AMO functional units; and
  output a vector instruction of a vector functional unit to implement the second portion.

13. The article of claim 12 wherein the identifying of the first portion is based on a function of memory transfer overhead.

14. The article of claim 12 wherein the identifying of the first portion is based on a function of computational speed difference between the vector AMO functional unit and the vector functional unit.

15. An article comprising a memory having instructions for controlling a computer to compile program code with an iterative loop into code for execution by an vector atomic memory operation (AMO) functional unit and by a vector functional unit of a processor, the instructions comprising instructions that:
  scan program code to determine whether an operation is vectorizable;
  if the operation is vectorizable, determine whether a portion of the operation should be executed using a vector AMO instruction in one of the vector AMO functional units; if the portion of the operation should be executed using a vector AMO instruction in one of the vector AMO functional units, compile the portion of the operation to execute in a vector AMO functional unit; and
  if the portion of operation should not be executed using a vector AMO instruction in one of the vector AMO functional units, compile the portion of the operation to execute in one or more vector functional units of one or more processors.

16. The article of claim 15, wherein determining whether the portion of the operation should be executed using a vector AMO instruction in one of the vector AMO functional units is a function of memory transfer overhead.

17. The article of claim 15, wherein determining whether the portion of the operation should be executed using a vector AMO instruction in one of the vector AMO functional units is a function of computational speed difference between one or more of the vector functional units and one or more of the vector AMO functional units.

18. The article of claim 15, wherein the program code includes an array having an additional dimension depicting processor number and wherein determining whether the portion of the operation should be executed using a vector AMO instruction in one of the vector AMO functional units is a function of processor number.

* * * * *

UNITED STATES PATENT AND TRADEMARK OFFICE
CERTIFICATE OF CORRECTION

PATENT NO.        : 8,583,898 B2                          Page 1 of 1
APPLICATION NO.   : 12/484062
DATED             : November 12, 2013
INVENTOR(S)       : Terry D. Greyzck It is certified that error appears in the above-identified patent and that said Letters Patent is hereby corrected as shown below:

In the Specification:

In column 6, line 49, delete "  " and insert --  --, therefor.

In the Claims:

In column 8, line 66, in claim 6, delete "be not" and insert -- not be --, therefor.

Signed and Sealed this
Twenty-fifth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,583,898 B2  
APPLICATION NO. : 12/484062  
DATED : November 12, 2013  
INVENTOR(S) : Terry D. Greyzck Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this
Tenth Day of March, 2015

Michelle K. Lee
*Deputy Director of the United States Patent and Trademark Office*